United States Patent

[11] 3,631,986

[72] Inventor Andre Sausse
Sceaux, France
[21] Appl. No. 885,486
[22] Filed Dec. 16, 1969
[45] Patented Jan. 4, 1972
[73] Assignee Rhone-Poulenc S.A.
Paris, France
[32] Priority Dec. 16, 1968
[33] France
[31] 178506

[54] DIALYZER
1 Claim, 6 Drawing Figs.
[52] U.S. Cl. .................................................. 210/321, 210/350
[51] Int. Cl. .................................................. B01d 31/00, B01d 13/00
[50] Field of Search ............................................. 210/22, 321, 350, 351

[56] References Cited
OTHER REFERENCES

Shinaberger et al., " Further Development and Clinical Evaluation of the Klung Dialyzer," from Trans. Amer. Soc. Artif. Int. Organs, Vol. XII, received in Patent Office July 6, 1966, copy in GP. 176, pp. 363-367.
Kidney: A Preliminary Report," from Trans. Amer. Soc. Artif. Int. Organs, Vol. IX, 1963, pp. 73-78.

*Primary Examiner*—Frank A. Spear, Jr.
*Attorney*—Stevens, Davis, Miller & Mosher ABSTRACT: A dialyzer e.g., to act as an artificial kidney in which plates are stacked in pairs between supports, and have interposed pairs of semipermeable membranes. First exchange zones are formed between the membranes and their adjacent plates which are provided with parallel ribs and grooves, and second exchange zones are formed between the membranes of a pair. In order to exert a constant pressure, a flexible-walled bag is located between the outermost plates and a support, over the projected area of the exchange zones.

Inventor
ANDRE SAUSSE

DIALYZER

The present invention relates to a dialyzer of the type using flat semipermeable membranes, where all the elements are stacked and clamped between two support plates.

Such a dialyzer can be used chiefly as an artificial kidney. It may also be used as a heat exchanger, for example between the blood and an appropriate liquid. Equipped with suitable membranes, it can be used as a membrane-type oxygenator. It is also suitable for the treatment of liquids other than blood, and the word "blood" is used in the present specification only in order to simplify the terminology.

In known dialyzers of this type, a stack of plates and membranes is arranged between two support plates which are clamped by means of a nut and bolt system. Whatever the number of clamping points, the strength of the support plates or the type of sealing elements used, the forces exerted locally by the clamping system to obtain a suitable sealing tightness cause slight deformations to the stack of plates and membranes. Since the plates remain constant in thickness, these deformations result in a variable spacing of the membranes. Since the mean distance between two membranes is of the order of a few tenths of a millimeter, these variations in spacing are very considerable in relative value, which gives rise to various disadvantages.

Within the dialyzer the blood is distributed irregularly in the space between the membranes of a pair and also between the various pairs of membranes arranged in parallel, which substantially reduces the effectiveness of the exchanges. In addition, the variable spacing of the membranes causes substantial variations in the space available for the blood within the dialyzer. The volume of this space, which depends on the clamping of the various elements of the dialyzer, is therefore indeterminate and may be too large, which may make it necessary to effect a transfusion.

According to the present invention there is provided a dialyzer comprising at least one pair of plates stacked in overlying relation to one another, a pair of semipermeable membranes between each pair of plates, a first exchange zone formed between each membrane and its adjacent plate, a second exchange zone formed between the two membranes of a pair, means to feed a first liquid to and from the first exchange zone, means to feed a second liquid to and from the second exchange zone, and at least one flexible-walled chamber exerting a uniform controlled pressure on at least a portion of said plates. With such a construction a very small specific volume is available to the blood, and it is possible to have well-balanced independent internal circuits permitting effective exchanges and very reliable operation.

In order that the invention may more readily be understood, the following description is given, merely by way of example, reference being made to the accompanying drawings, in which.

Figure 1:
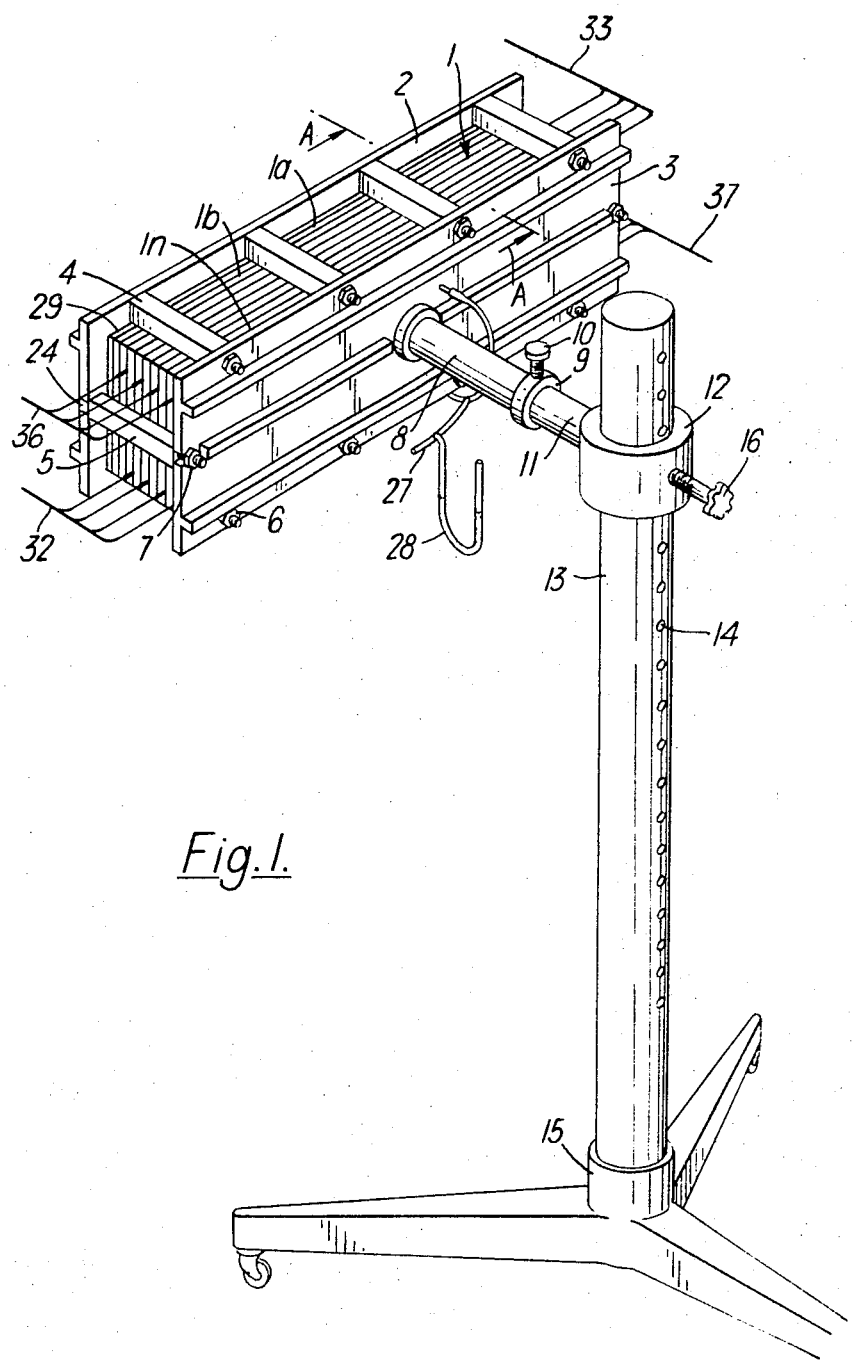
FIG. 1 is a schematic perspective general view of one embodiment dialyzer according to the invention, suitable for use as a blood dialyzer.

The blood dialyzer shown in FIG. 1 comprises a stack 1 of rectangular, thin, flat plates 1a, 1b, 1n, arranged between two similar and symmetrical support plates 2 and 3 which are clamped by screw-threaded pins 4 and 5 and nuts 6 and 7. The support plate 3 is mounted on a horizontal sleeve 8, which is slipped over a shaft 11 having an abutment 9 provided with a locking screw 10. The sleeve can be rotated to a desired position and locked by screw 10. At its end, the shaft 11 is provided with a collar 12, which can slide along a vertical tubular support 13 provided with a series of holes 14 and, at its base, with a supporting tripod 15. It is possible to lock the dialyzer at the desired height by introducing a screw-threaded pin 16 through the collar 12 and a hole 14, so that the height and inclination of the dialyzer can be adjusted as desired.

Figure 2:
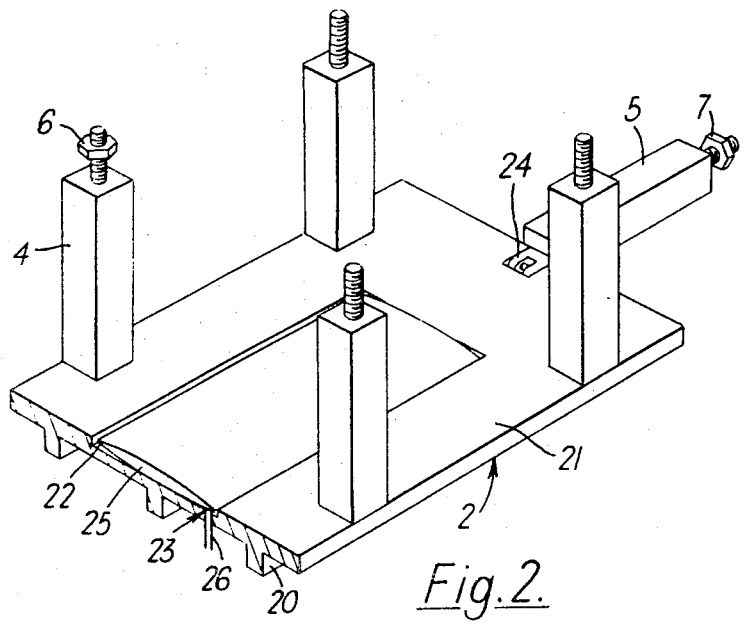
FIG. 2 is a perspective view of half of one of the support plates of the dialyzer of FIG. 1.

The support plate, a part of which is shown in FIG. 2, is constituted by a rigid rectangular support plate 20 the dimensions of which are at least equal to those of one of the plates of the stack 1. One face 21 of the support plate is plane, with a rectangular, central, shallow recess 22. The area of the recess is equal to the area of the exchange zones between two plates, to be described later. Communication between the recess 22 and the exterior is provided by an orifice 23.

The support plates 2 and 3 can be assembled and secured together by the fixed screw-threaded pins 4 along the longitudinal edge of the support plate, and one rockable screw-threaded pin 5 arranged on the lateral edge of the plate and pivoted at 24. Each screw-threaded pin comprises a nonscrew-threaded section constituting a spacer the height of which is chosen to be equal to the thickness of the stack of plates, taking into account the membranes and sealing elements to be described later.

Located in the recess 22 is an inflatable chamber 25 constituted by a flexible-walled sealing-tight envelope, having a nozzle 26 passing through the orifice 23. A conduit 27 (FIG. 1) connected to the nozzle, provides communication between the interior of the chamber 25 and a source of fluid under pressure (not shown), and a pressure gauge 28 indicates at each instant the pressure prevailing within the chamber 25. The apparatus shown in FIG. 1 has two inflatable chambers which are identical and are both connected to the conduit 27.

Figure 3:
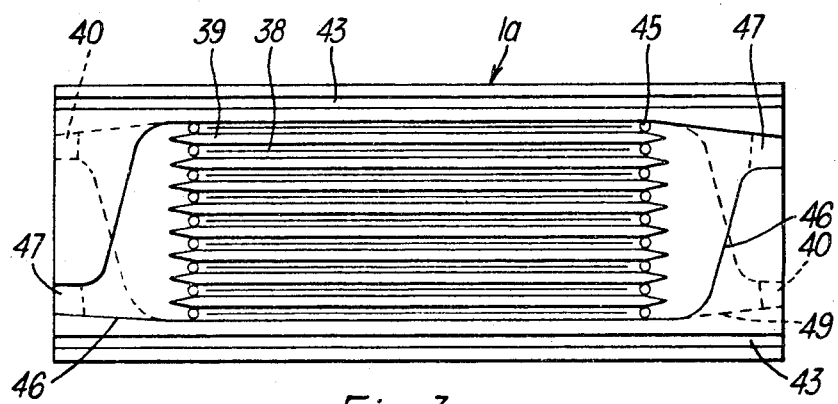
FIG. 3 is a top plan view of one of the plates of the dialyzer of FIG. 1.
Figure 4:
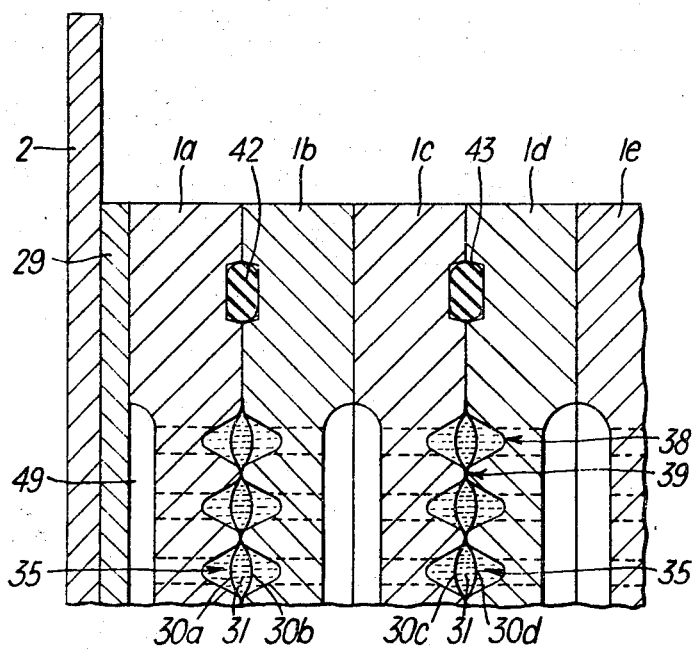
FIG. 4 is a scrap section taken on the line AA of FIG. 1, and shown to a larger scale.

As can be seen from FIGS. 3 and 4, the plates are rectangular and symmetrical and are assembled together in pairs. Two plates of one and the same pair, such as 1a and 1b, hold between their facing front faces, which are provided with grooves and recesses, two membranes 30a and 30b placed flat and hermetically sealed at their periphery to form a flattened bag.

First exchange zones 35, formed between a membrane and its adjacent plate, are connected at each end, laterally and individually, preferably by means of unions 34 of special shape, to be described later, and flexible sleeves, to headers 36 and 37 externally of the dialyzer for the admission and discharge of dialysis liquid. Second exchange zones 31 formed between the two membranes of a pair are connected at each end, laterally and individually, to headers 32 and 33 externally of the exchanger for the admission and discharge of blood by further unions 34 and flexible sleeves.

The headers 32 and 33 on the one hand and 36 and 37 on the other hand are arranged so as to permit ascending flows at the inlet and outlet of the apparatus.

The front faces of each pair of plates are formed with a plurality of parallel, longitudinal grooves 38 the pitch of which is between 0.2 and 2 mm. and preferably between 0.5 and 1.5 mm. The grooves are separated by ribs 39 the apex of which is situated in the plane of the front face of the plate. The ribs of the same row are therefore arranged in register with one another over their entire length, throughout the stack of plates. For this, plates have to be fitted relatively to one another by any suitable means, which may be carried by the plates and constituted for example by centering studs, shoulders etc., or externally of the plates and constituted for example by pins similar to the pins 4 and 5 which connect two support plates.

The cross section of the grooves may for example be triangular, trapezoidal, square or sinusoidal, and is substantially constant over the entire length of the grooves. The number of plates constituting the stack 1 is not critical; it is determined by the ratio between the total exchange surface required and the effective exchange surface between two plates. For example it is possible to arrange 16 plates enclosing eight pairs of membranes, each pair having a unitary exchange surface of 1,000 square cm.

In the vicinity of its ends, each groove opens on to an aperture 45 which extends right through the plate before widening beyond the said orifice. Two consecutive grooves may, if desired open at each end on to one and the same orifice 45, the consecutive ribs 39 being of unequal length. On the grooved face of the plate, two similar recesses 46 prolong the network of grooves 38, the recesses having a substantially constant cross section, and being connected progressively at the two ends of the plate at diagonally opposite positions with lateral passages 47 within which are arranged unions 34. The orifices 45 give access to the opposite face of the plate, at each side, to a depression 49. These depressions 49 are similar to the recesses 46 and they are connected gradually with two lateral ducts 40 in diagonally opposite positions complementary to passages 47.

The sealing-tightness of the circuits within a pair of plates such as 1a and 1b, between these plates and the membranes 30a and 30b, can be ensured either by gluing the plates or by using sealing elements such as toroidal sealing elements 42 fitted into longitudinal grooves 43 and 44. The plates are thus clamped into contact with one another independently of the nature of the sealing elements, these being formed within the grooves. Sealing tightness between two plates such as 1b and 1c can be obtained by any known means such as gluing, welding with the use of heat, or simply by the application of two polished faces against one another. The sealing tightness of the dialysis liquid circuits between the support plates and the outermost operating plates 1a and 1n can be provided by two sheets 29 made of, for example, polyethylene, which are adhesively secured to the outermost plates.

Figure 5:
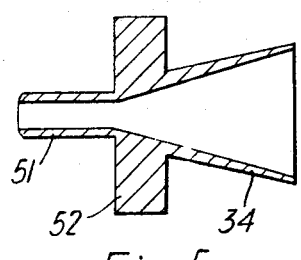
FIG. 5 is an axial section through a union used in the dialyzer.

FIG. 5 shows a union 34 comprising a tubular end piece 51 which can be connected to the header tubes 32 and 33 and header tubes 36 and 37, directly or preferably via flexible sleeves made of, for example, silicone elastomers, of sufficient length to enable them to be closed for example by nipping clips. Adjacent the end piece is a thin-walled tubular portion the height of which corresponds to the height of the duct 40 or passage 47 and the width of which increases progressively as the width of the said ducts. A shape of this kind enables the union to be satisfactorily anchored in the dialyzer. Flanges 52 bearing on the outer face of the plates prevent the union moving into the duct 40 or passage 47.

In operation, the membranes and the plates are stacked successively after having positioned the sealing elements 42 and adhesively secured the membranes to the unions 34, and the plates 1a and 1b to one another about the recesses 46 and the plates 1b and 1c about the depressions 49. Then the sheets 29 are adhesively secured to the outer faces of the plates 1a and 1n. The retaining and/or sealing tightness of the stack thus obtained can be achieved where appropriate by any suitable clamping means before positioning between the support plates. The stack of plates and membranes is then introduced between the support plates 2 and 3 previously equipped with an inflatable flexible-walled chamber 25. The nuts 6 and 7 are tightened on the screw-threaded pins 4 and 5 until the support plates abut against the nonscrew-threaded ends of the pins 4 and 5. This provides a perfectly adjusted and sealing-tight assembly. The various headers are connected, and the inflatable chambers 25 are connected to the source of fluid under pressure. The position of the apparatus is suitably regulated in accordance with the desired pressures for the blood, the dialysis liquid and, if appropriate, the fluid acting on the inflatable chambers. Its inclination is regulated in order to eliminate any possible air bubbles and to permit complete emptying at the end of an operation. By means of the pressure gauge 28 the relative pressure prevailing in the chambers 25 is regulated to values generally of between 0 and 1 atmospheres and preferably between 0.05 and 0.4 atmospheres. For example, the two inflatable chambers are filled with water and held under a pressure head of 2 meters.

The apparatus is then ready for use and its features give it the following advantages:

It will be noted that, under the action of the inflation pressure of the chambers 25 arranged between the plates, the plates first of all very slightly approach one another, compressing the membranes, the glue and the sealing elements, and then maintain a final position, even if the pressure is increased. This position of the plates corresponds to a strictly determined total volume made available to the blood and the dialysis liquid. This volume can be calculated and chosen to be relatively small. It is generally between 60 and 600 cc. This volume is divided approximately in the ratio of 20 to 80 percent and preferably in the ratio of 40 to 60 percent made available for the blood and the remainder for the dialysis liquid, in accordance with the pressure differences between the blood and the dialysis liquid displaced by a pump.

The pressure losses within the apparatus are small, more particularly the pressure loss of the blood circuit, which permits using the blood dialyzer without a pump. Thus, by way of example, for an artificial kidney having eight pairs of membranes, with a total surface of 0.8 square meters and making available for the blood a total volume of 250 cc., the pressure loss of the blood circuit is only 20 mm. of mercury for a blood flow rate of 180 cc./min. When the dialysis liquid flows at a rate of 500 cc./min. in countercurrent and at a mean pressure 100 mm. of mercury lower than that of the blood circuit, the pressure loss of the dialysis liquid circuit is likewise only 15 mm. of mercury.

One of the main advantages of this blood dialyzer resides in the possibility of further reducing the pressure loss of the blood circuit within the apparatus in the case of a reduction in the flow rate and the blood pressure at the outlet of the device for taking the patient's blood. In fact it is sufficient to reduce the pressure of the fluid in the inflation chambers to bring about a very slight but uniform withdrawal from one another of the plates and instantaneously reduce the pressure loss of the blood circuit within the dialyzer. The sealing tightness of the latter is still maintained by the initial clamping action.

Between the ends of a plate, the flow of blood is effected between the membranes which move apart under the effect of the pressure difference between the blood and the dialysis liquid between the grooves which are opposite one another in pairs, constituting as many thin parallel ducts. The very small cross section of these ducts leads to a very high ratio of exchange surface to blood volume, ensuring very effective exchanges.

Thus, for the artificial kidney mentioned hereinbefore, by way of example, and for a flow rate of 500 cc./min. of dialysis liquid, the urea cleansing rate reaches 84 cc./min. for a blood flow rate of 200 cc./min. and 94 cc./min. for a blood flow rate of 300 cc./min.

The blood and the dialysis liquid can flow either in cocurrent or preferably in countercurrent.

The arrangement of the unions 34 substantially at the diagonally opposite ends of the plate permits balancing of the pressure losses over all the grooves, which promotes flows of blood and dialysis liquid which are equally distributed in contact with the entire exchange surface and considerably improve the effectiveness of the exchanges. The particular form of the depressions and recesses make it possible to avoid having dead spaces and also the risks of initiating blood coagulation.

The individual supplying and discharging of each circuit with blood and dialysis liquid permit a remarkably reliable operation. In fact, in the case where a membrane becomes pierced during treatment, the dialysis liquid (flowing under a lower pressure than that of the blood) becomes colored and the corresponding circuit is immediately detected. It is then easy to isolate this circuit by nipping off the flexible sleeves connecting it to the headers. The other circuits enable treatment to be carried on normally.

The plates are generally made from rigid or semirigid thermosetting or thermoplastic material, for example polystyrene, polyolefines or polyamides, which lend themselves to injection moulding and, if appropriate, can be thrown away after a single use owing to their low cost price, which provides the best possible guarantee as regards hygiene.

The membranes are preferably, but not necessarily, films of regenerated cellulose, such as that sold under the trade name "Cellophane." Advantageously the sealing elements 32 are made of elastomers of medical quality, for example silicone elastomers.

It is possible to provide sealing tightness for the blood and dialysis liquid circuits between two plates for example by means of pressure-sensitive adhesives.

The support plates may be made of any material having appropriate mechanical strength and advantageously great lightness: they can be metallic (for example made of duralumin) or plastics material (for example polyamide).

The flexible sheet constituting the flexible-walled chambers 25 may be made of any suitable material, for example an elastomer, polyethylene or plasticized vinyl chloride.

Figure 6:
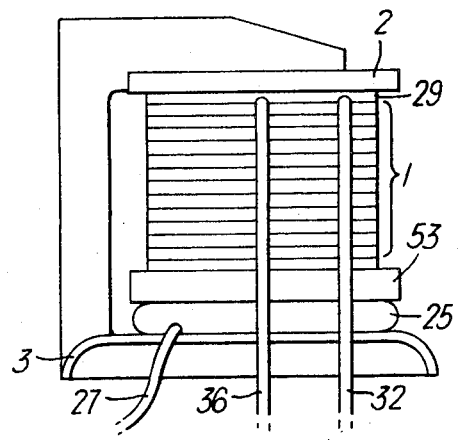
FIG. 6 is an end view of a modified embodiment of the dialyzer.

A blood dialyzer has been described and illustrated by way of example, but of course the dialyzer can be used for various applications such as those mentioned hereinbefore, and in many constructional variants. Thus, the inflatable chambers 25 may exert a pressure on some or all of the face of one plate, preferably on a surface corresponding substantially to the grooved surface. It is possible to use an inflatable chamber of different form and constitution. For example a chamber containing a pressure-equalizing fluid may be hermetically closed, the other chamber alone being connected to a source of fluid under pressure. It is possible to use an inflatable chamber between each pair of plates; in this case the inflatable chamber can be accommodated in cavities (not shown) formed in the plates on the faces opposite from the grooved faces. It is possible to use only a single inflatable chamber, connected to a rigid fixed support. It is possible to interpose a support member 53 which is flexible or semirigid between the inflatable chamber and the stack of plates (see FIG. 6). It is also possible to use only one inflatable chamber, this surrounding laterally, entirely, the stack of plates and membranes and exerting a pressure on the opposite faces of the outer plates of this stack.

I claim:
1. A dialyzer comprising, in combination:
 a. a plurality of pairs of plates stacked in overlying relation to one another, each of said plates being substantially rectangular and symmetrical, and comprising a front face and a backface with the front faces of a pair of plates being in facing relation;
 b. a pair of semipermeable membranes between the front faces of each pair of plates, whereby each membrane has a plate adjacent thereto;
 c. means defining a first exchange zone between each membrane and its adjacent plate;
 d. means defining a second exchange zone between the two membranes of a pair;
 e. means to feed a first liquid to and from the first exchange zone;
 f. means to feed a second liquid to and from the second exchange zone;
 g. at least one flexible-walled chamber exerting a uniform controlled pressure on at least a portion of said plates;
 h. a plurality of longitudinal, parallel grooves separated by a plurality for longitudinal parallel ribs defined on said front faces, the ribs of a pair of plates being in register with one another;
 i. a depression on the backface of each plate of substantially constant cross section;
 j. diagonally opposite ducts to feed said first liquid to and from said first exchange zone, said ducts being defined between the backfaces of the plates of adjacent pairs and communicating with said depression;
 k. apertures defined in said plates and communicating said grooves with said depression;
 l. recesses on the front face of said plates communicating with said grooves; and
 m. diagonally opposite passages, complementary to said ducts, to feed said second liquid to and from said second exchange zone.

* * * * *